(12) United States Patent
Yanagisawa et al.

(10) Patent No.: US 9,743,412 B2
(45) Date of Patent: Aug. 22, 2017

(54) WIRELESS COMMUNICATION SYSTEM

(71) Applicant: Hitachi Kokusai Electric, Inc., Tokyo (JP)

(72) Inventors: Kei Yanagisawa, Tokyo (JP); Keigo Hasegawa, Tokyo (JP); Masayuki Takekawa, Tokyo (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 86 days.

(21) Appl. No.: 14/768,560

(22) PCT Filed: Jan. 16, 2014

(86) PCT No.: PCT/JP2014/050611
§ 371 (c)(1),
(2) Date: Aug. 18, 2015

(87) PCT Pub. No.: WO2014/132688
PCT Pub. Date: Sep. 4, 2014

(65) Prior Publication Data
US 2016/0007358 A1 Jan. 7, 2016

(30) Foreign Application Priority Data
Feb. 27, 2013 (JP) .................................. 2013-037391

(51) Int. Cl.
*H04L 5/14* (2006.01)
*H04B 7/00* (2006.01)
(Continued)

(52) U.S. Cl.
CPC ....... *H04W 72/0473* (2013.01); *H04W 4/023* (2013.01); *H04W 52/244* (2013.01);
(Continued)

(58) Field of Classification Search
CPC ...................... H04W 72/0453; H04W 72/0473
See application file for complete search history.

(56) References Cited

U.S. PATENT DOCUMENTS

2005/0018241 A1* 1/2005 Azami ............... H04N 1/00204
358/1.15
2011/0096770 A1* 4/2011 Henry ................... H04W 16/14
370/352
(Continued)

FOREIGN PATENT DOCUMENTS

WO 2012/028769 A1 3/2012

OTHER PUBLICATIONS

Hiroshi Harada, et al., "Wireless Smart Utility Network (WiSUN)" by Advanced Dynamic Spectrum Management Technologies, IEICE Technical Report. Sr, Software Musen, Jan. 19, 2012, 111(417), pp. 51-58.

(Continued)

*Primary Examiner* — Faruk Hamza
*Assistant Examiner* — Abu-Sayeed Haque
(74) *Attorney, Agent, or Firm* — Brundidge & Stanger, P.C.

(57) ABSTRACT

In the wireless communication system, each of a base station 11 and a terminal station 12 obtains its location information, and upon establishment of synchronization, the terminal station 12 transmits a terminal station free channel list and its location information by extremely low power wireless communication, and the base station 11 compares a base station free channel list created based on information from a database 40 with the terminal station free channel list from the terminal station 12, and determines, when there is a common free channel, the free channel as uplink/downlink channels and determines, when there is no common free channel, an uplink channel and a downlink channel as different channels, calculates a base station-terminal station (Continued)

distance from the location information of the base station 11 and the location information of the terminal station 12, and determines terminal station's uplink transmission power based on the distance.

6 Claims, 6 Drawing Sheets

(51) Int. Cl.
    *H04L 12/28*     (2006.01)
    *H04J 3/00*     (2006.01)
    *H04W 72/04*     (2009.01)
    *H04W 52/24*     (2009.01)
    *H04W 4/02*     (2009.01)
    *H04W 64/00*     (2009.01)
    *H04W 52/14*     (2009.01)

(52) U.S. Cl.
    CPC ..... *H04W 64/003* (2013.01); *H04W 72/0406* (2013.01); *H04W 72/048* (2013.01); *H04W 52/146* (2013.01)

(56) References Cited

U.S. PATENT DOCUMENTS

| | | | |
|---|---|---|---|
| 2011/0228666 A1* | 9/2011 | Barbieri | H04W 76/023 370/216 |
| 2011/0231701 A1* | 9/2011 | Aoki | G03G 15/5079 714/15 |
| 2013/0005375 A1* | 1/2013 | Chen | H04W 52/346 455/509 |
| 2013/0148517 A1* | 6/2013 | Abraham | H04B 7/12 370/252 |
| 2013/0343219 A1* | 12/2013 | Kronander | H04W 52/243 370/252 |

OTHER PUBLICATIONS

Hiroshi Harada, "Status Report on Usage of TV White Space in Japan (Liaison Report to JP MIC)", IEEE 802.11-12/1396r0, IEEE mentor, Nov. 14, 2012, pp. 1-20.

\* cited by examiner

SCHEMATIC CONFIGURATION OF THE SYSTEM

CONFIGURATION OF BASE STATION

CONFIGURATION OF TERMINAL STATION

SEQUENCE OF CHANNEL DETERMINATION AND TRANSMISSION POWER DETERMINATION IN FIRST SYSTEM

SEQUENCE OF CHANNEL DETERMINATION AND TRANSMISSION POWER DETERMINATION IN SECOND SYSTEM

SEQUENCE OF CONVENTIONAL CHANNEL DETERMINATION AND TRANSMISSION POWER DETERMINATION

INTERFERENCE ON PRIMARY USE SYSTEM CAUSED BY SECONDARY USE SYSTEM

WIRELESS COMMUNICATION SYSTEM

TECHNICAL FIELD

The present invention relates to a wireless communication system using white spaces which are not used by a primary use system. More specifically, the present invention relates to a wireless communication system capable of reducing interference on a primary use system.

BACKGROUND ART

Description of Prior Art

There is a wireless communication system that utilizes white spaces to effectively use a frequency spectrum. The wireless communication system that utilizes white spaces includes an existing wireless system (primary use system) that is licensed to use assigned frequencies; and a secondary use system that is not licensed and that uses a frequency spectrum (white spaces) which is not used by the primary use system, temporarily or in a limited area.

The wireless communication system that utilizes white spaces is provided with a database (DB) to adjust use of frequencies. The database stores information (allowance information) for the secondary use system to use a frequency spectrum. A base station in the secondary use system accesses the database and uses a frequency spectrum on an allowed condition.

[Sequence of Conventional Channel Determination/Transmission Power Determination: FIG. 6]

A sequence of conventional channel determination/transmission power determination in the secondary use system will be described using FIG. 6. FIG. 6 is a flowchart showing a sequence of conventional channel determination/transmission power determination in the secondary use system. As shown in FIG. 6, the base station in the secondary use system accesses the database (S501) to obtain, from the database, information on available channels and transmission power allowed to be transmitted by the channels (e.g., EIRP: Effective Isotropic Radiated Power), etc., as free channel information. The base station creates a free channel list based on the obtained information and determines base station's transmission power (S502).

Then, the base station determines an uplink channel and a downlink channel based on the free channel list (S503) and transmits a downlink signal at the transmission power determined at the process S502, using the determined downlink channel (S504).

A terminal station waits for reception of a downlink signal from the base station (S601) and determines whether a downlink signal has been detected (S602). If a downlink signal has been detected, the terminal station transmits initial ranging (S603). Note that the terminal station may perform its own sensing to detect free channels available thereto.

When the base station receives the initial ranging from the terminal station (S505), the base station determines terminal station's transmission power, based on the received power of the initial ranging (S506). In this manner, a sequence of the conventional channel determination/transmission power determination in the secondary use system is performed.

[Interference on the Primary Use System Caused by the Secondary Use System: FIG. 7]

Next, the case in which interference on the primary use system caused by the secondary use system occurs will be described using FIG. 7. FIG. 7 is a schematic illustrative diagram showing interference on the primary use system caused by the secondary use system. The case is considered in which, as shown in FIG. 7, a secondary user area 3 covered by a base station 1 in the secondary use system is present close to a primary user area 4 covered by the primary use system. The base station 1 in the secondary use system determines uplink/downlink channels, based on free channel information obtained from the database. Along with that, a terminal station 2 performs sensing to check channels being used therearound.

However, when a terminal station 5 in the primary use system is, for example, a reception-only terminal such as a television receiver, detection by sensing is impossible. Thus, as shown in FIG. 7, there is a possibility that an uplink transmission wave from the terminal station 2 which is located at the edge of the area of the secondary use system may cause interference interfering with the terminal station 5 in the primary use system.

In addition, in a portable wireless system using white spaces, there is also considered a mode in which the base station 1 is not connected to the Internet. In that case, it is difficult to access the database, and thus, there is a possibility that a downlink transmission wave from the base station 1 in the secondary use system may also likewise cause interference interfering with the terminal station 5 in the primary use system.

Furthermore, in the secondary use system, it is common to control the transmission power of the terminal station, based on the received power at the base station. When the received power is attenuated due to the influence of multipath, the terminal station's uplink transmission power is controlled to be larger, increasing the possibility that interference may interfere with the primary use system.

Related Art

Note that, for techniques related to a wireless communication system using white spaces, there is, for example, Non Patent Literature 1.

Non Patent Literature 1 proposes a protocol for agile evacuation by a secondary user when a primary user has returned in a state in which the secondary user uses a frequency spectrum that is not used by the primary user.

CITATION LIST

Non Patent Literature

Non Patent Literature 1: Xin Liu and Zhi Ding: ESCAPE: A Channel Evacuation Protocol for Spectrum-Agile Networks: IEEE DySPAN, pp 292-302 (April 2007)

SUMMARY OF INVENTION

Technical Problem

The conventional wireless communication system has problems, for example, interference may interfere with the primary use system while synchronization is established between the base station and the terminal station in the secondary use system, and interference may occur as a result of not being able to perform appropriate transmission power control.

The present invention is made in view of the above-described circumstances, and an object of the present invention is to provide a wireless communication system capable of avoiding interference with the primary use system.

Solution to Problem

The present invention for solving the above-described problems of the conventional example is directed to a wireless communication system that performs wireless communication between a base station and a terminal station, using a white space, wherein the base station creates and stores a base station free channel list as information on available channels, and obtains and stores location information of the base station, the terminal station creates and stores a terminal station free channel list as information on available channels, and obtains and stores location information of the terminal station, when the terminal station receives a downlink signal from the base station upon establishment of synchronization, the terminal station transmits, by extremely low power wireless communication, the location information of the terminal station and the terminal station free channel list to the base station, and when the base station receives an uplink signal from the terminal station by extremely low power wireless communication, the base station calculates a distance between the base station and the terminal station based on the location information of the terminal station included in the received signal and the location information of the base station, determines uplink transmission power of the terminal station based on the distance, compares the terminal station free channel list with the base station free channel list, and determines, when there is a same free channel, the same free channel as an uplink channel and a downlink channel, and determines, when there is no same free channel, an uplink channel and a downlink channel as different channels.

In addition, the present invention includes, in the wireless communication system, the base station accesses a database to obtain, from the database, information on channels available to the base station, to create a base station free channel list, the database managing information on available channels.

In addition, the present invention is such that, in the wireless communication system, the base station identifies available channels by sensing, to create a base station free channel list, and transmits a downlink signal to the terminal station by extremely low power wireless communication.

In addition, the present invention is such that, in the wireless communication system, when there is no common free channel between the terminal station free channel list and the base station free channel list as a result of the comparison between the terminal station free channel list and the base station free channel list, the base station determines an uplink channel based on the terminal station free channel list, and determines a downlink channel based on the base station free channel list.

Advantageous Effects of Invention

According to an exemplary embodiment of the present invention, a wireless communication system that performs wireless communication between a base station and a terminal station, using a white space including the base station creates and stores a base station free channel list as information on available channels, and obtains and stores location information of the base station, the terminal station creates and stores a terminal station free channel list as information on available channels, and obtains and stores location information of the terminal station, when the terminal station receives a downlink signal from the base station upon establishment of synchronization, the terminal station transmits, by extremely low power wireless communication, the location information of the terminal station and the terminal station free channel list to the base station, and when the base station receives an uplink signal from the terminal station by extremely low power wireless communication, the base station calculates a distance between the base station and the terminal station based on the location information of the terminal station included in the received signal and the location information of the base station, determines uplink transmission power of the terminal station based on the distance, compares the terminal station free channel list with the base station free channel list, and determines, when there is a same free channel, the same free channel as an uplink channel and a downlink channel, and determines, when there is no same free channel, an uplink channel and a downlink channel as different channels. Thus, there are advantageous effects that the terminal station's excess uplink transmission power is prevented from being set by determining an appropriate terminal station's uplink transmission power according to a base station-terminal station distance, and interference affecting a primary use system can be suppressed by performing uplink/downlink communication using a channel that is not used by a neighboring system.

In addition, according to an exemplary embodiment of the present invention, a wireless communication system including the base station accesses a database that manages information on available channels, to obtain, from the database, information on channels available to the base station, to create a base station free channel list. Thus, there is an advantageous effect that a base station free channel list can be created by a simple process.

In addition, according to an exemplary embodiment of the present invention, a wireless communication system including the base station identifies available channels by sensing, to create a base station free channel list, and transmits a downlink signal to the terminal station by extremely low power wireless communication. Thus, there is an advantageous effect that, even when information from the database cannot be used, the terminal's uplink transmission power and uplink/downlink channels are appropriately determined, preventing interference from interfering with the primary use system.

DESCRIPTION OF EXEMPLARY EMBODIMENTS

An exemplary embodiment of the present invention will be described with reference to the drawings. A wireless communication system according to the exemplary embodiment of the present invention is used as a secondary use system in a wireless communication system that uses white spaces. Each of a base station and a terminal station includes a first communication processing unit capable of performing wide area wireless communication; and a second communication processing unit that performs extremely low power wireless communication using a spread spectrum signal. Upon establishment of synchronization between the base station and the terminal station, extremely low power wireless communication with small transmission power is performed, enabling suppression of interference interfering with a primary use system.

In addition, in the wireless communication system according to the exemplary embodiment of the present invention, the base station and the terminal station obtain longitude and latitude location information, and the terminal station notifies the base station of its location information upon establishment of synchronization, and the base station calculates a base station-terminal station distance based on the obtained location information of the base station and the received location information of the terminal station, and controls the terminal station's uplink transmission power based on the distance. Thus, excess transmission power due to the influence of multipath is prevented from being set, enabling suppression of the interference interfering with the primary use system.

In addition, in the wireless communication system according to the exemplary embodiment of the present invention, the terminal station obtains terminal station free channel information by sensing and notifies the base station of the terminal station free channel information upon establishment of synchronization, and the base station compares free channel information obtained from a database or base station free channel information obtained by sensing with the received terminal station free channel information and uses, when there is no common free channel, different channels for uplink/downlink.

Figure 1:
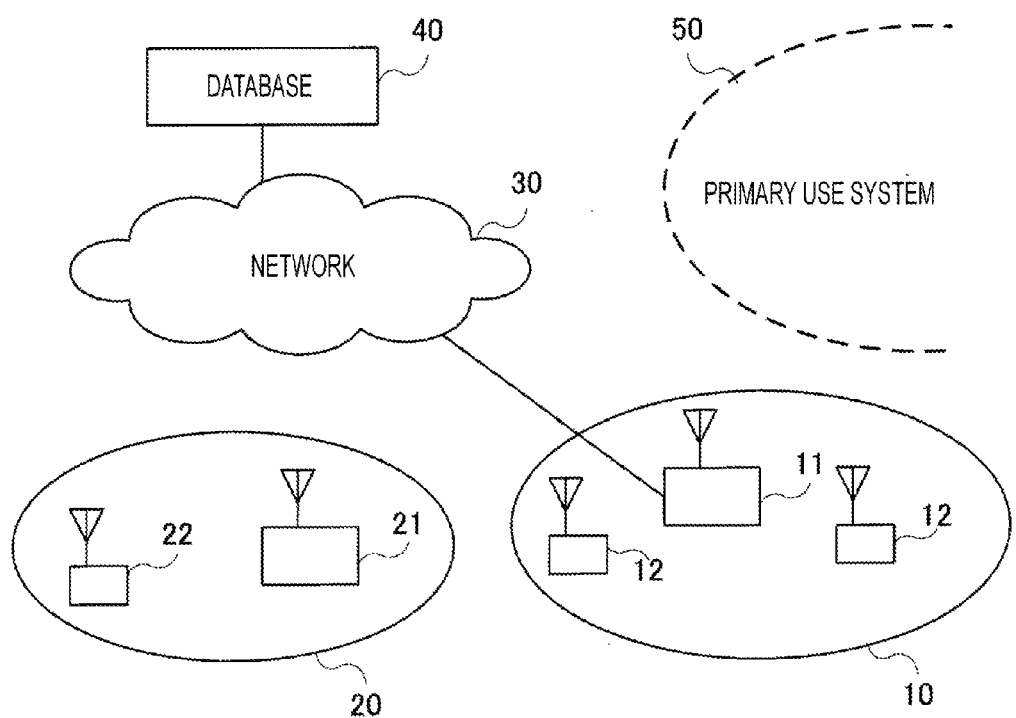
FIG. 1 is a schematic configuration diagram of a wireless communication system according to an exemplary embodiment of the present invention.

[Schematic Configuration of the Wireless Communication System According to the Embodiment: FIG. 1]

A schematic configuration of the wireless communication system according to the exemplary embodiment of the present invention will be described using FIG. 1. FIG. 1 is a schematic configuration diagram of the wireless communication system according to the exemplary embodiment of the present invention. As shown in FIG. 1, the wireless communication system (the system) according to the exemplary embodiment of the present invention is a secondary use system using white spaces which are not used by a primary use system 50. A base station 11 and terminal stations 12 are provided in a system that covers an area 10. A base station 21 and a terminal station 22 are provided in a system that covers an area 20.

In addition, the system is provided with a database 40 connected to a network 30. The database 40 stores free channel information as allowance information allowing use of the secondary use system. The database 40 is managed by a manager of the entire secondary use system. The base station 11 can access the database 40 through the network 30. In addition, the base station 21 is not connected to the network 30 and thus does not use the database 40.

Here, a description is made such that a secondary use system including the base station 11 that covers the area 10; the terminal stations 12 in the area 10; the network 30; and the database 40 is a first wireless communication system (first system), and a secondary use system including the base station 21 that covers the area 20; and the terminal station 22 in the area 20 is a second wireless communication system (second system). That is, in the embodiment, the first system is a mode of a system that can use the database, and the second system is a mode that does not use the database.

Figure 2:
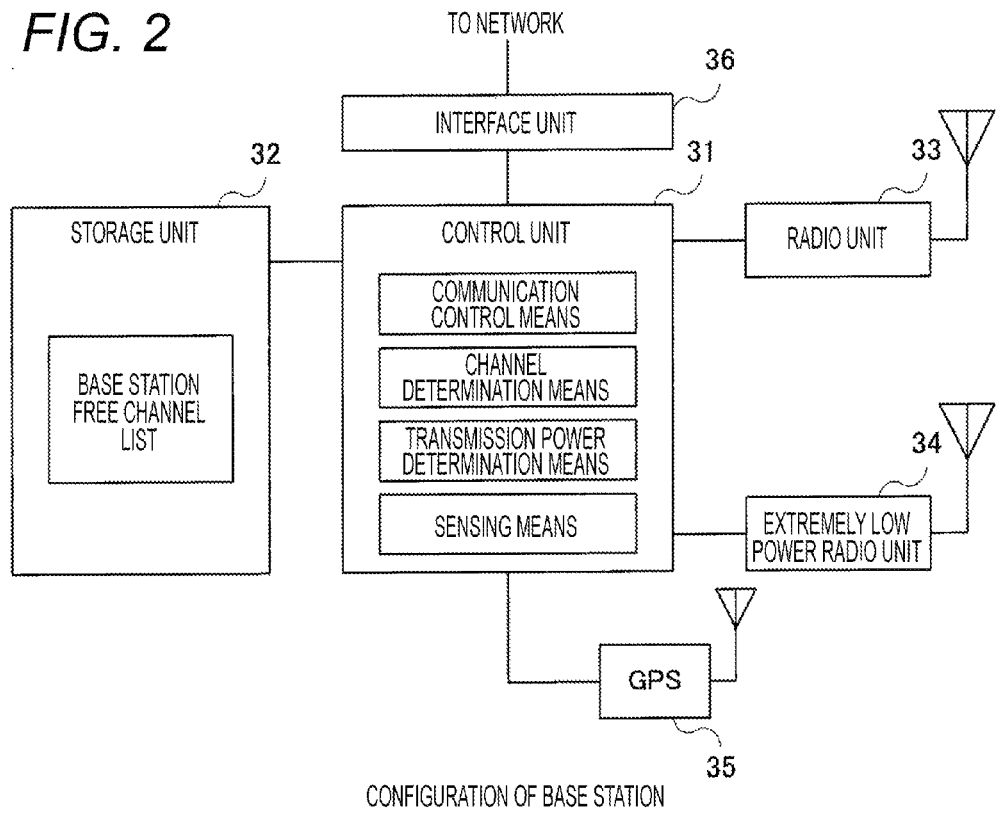
FIG. 2 is a schematic configuration block diagram of a base station in a first system according to an exemplary embodiment of the present invention.

[Configuration of the Base Station in the First System: FIG. 2]

Next, a schematic configuration of the base station 11 in the first system will be described using FIG. 2. FIG. 2 is a schematic configuration block diagram of the base station in the first system. Note that a configuration of the base station 21 in the second system is also basically the same as that of FIG. 2. As shown in FIG. 2, the base station 11 in the first system includes a control unit 31, a storage unit 32, a radio unit 33, an extremely low power radio unit 34, a GPS unit 35, and an interface unit 36. The control unit 31 includes, as processing means which are implemented by program operation, a communication control means, a channel determination means, a transmission power determination means, and a sensing means.

Each component will be described. The storage unit 32 stores a processing program for the control unit 31 and stores a base station free channel list created by the control unit 31. In addition, as a characteristic of the system, the storage unit 32 stores information for determining base station's downlink transmission power and terminal station's uplink transmission power, according to the distance between a terminal station 12 and the base station 11. The information will be described later.

The radio unit 33 transmits and receives radio signals with the terminal station 12 in the same manner as conventional ones. The radio unit 33 is transmits and receives at larger power than that of the extremely low power radio unit 34. The extremely low power radio unit 34 of the system transmits and receives at low-power by an extremely low power radio. The GPS unit 35 obtains location information of the base station 11 (longitude and latitude information) using an artificial satellite. The interface unit 36 connects to the network 30.

The control unit 31 performs overall control of the base station 11 and performs control of communication with the terminal station 12 in the same manner as conventional ones. The control unit 31 performs the process of determining uplink/downlink channels so as not to cause interference to the primary use system 50, and the process of determining transmission power according to a distance.

Each processing means in the control unit 31 will be described. The communication control means performs a spread/inverse spread spectrum process associated with extremely low power wireless communication upon establishment of synchronization with the terminal station 12, in addition to signal processing associated with communication with the terminal station 12, which is performed in the same manner as conventional ones.

The channel determination means determines uplink channels/downlink channels by comparing the base station free channel list stored in the storage unit 32 with a terminal station free channel list received from the terminal station 12. In the system, when there is no common free channel between the lists, an uplink channel and a downlink channel are determined as different channels. This makes it less likely to cause interference to the primary use system.

The transmission power determination means determines downlink transmission power of the base station 11 and uplink transmission power of the terminal station 12. The first system includes the transmission power determination means determines downlink transmission power of the base station 11, based on the distance between the base station 11 and the terminal station 12 and terminal station's received power. In addition, the transmission power determination means determines uplink transmission power of the terminal station 12, based on the distance. Determination of transmission power will be described later.

The sensing means senses signals of the primary use system and the secondary use system. A method for sensing may be a known method. When free channel information from the database 40 cannot be used like the base station 21 in the second system, the control unit 31 creates a free channel list, based on the results of sensing by the sensing means.

Figure 3:
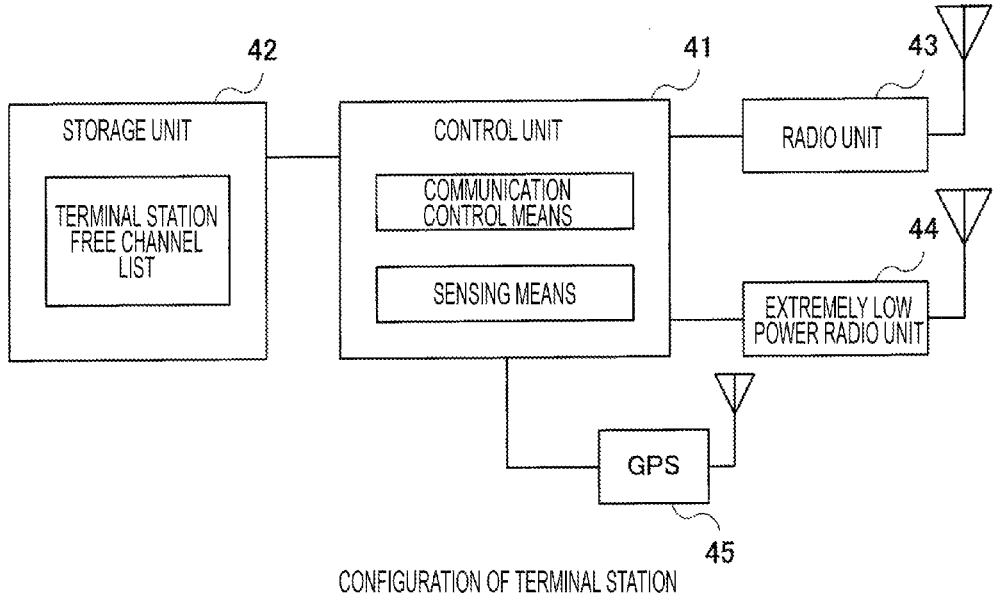
FIG. 3 is a configuration block diagram of a terminal station according to an exemplary embodiment of the present invention.

[Configuration of the Terminal Station: FIG. 3]

Next, a configuration of the terminal station 12 will be described using FIG. 3. FIG. 3 is a configuration block diagram of the terminal station 12. As shown in FIG. 3, the terminal station 12 includes a control unit 41, a storage unit 42, a radio unit 43, an extremely low power radio unit 44, and a GPS unit 45.

The control unit 41 performs overall control of the terminal station 12 and performs, for example, control of communication with the base station 11 and creation of a free channel list based on sensing. The storage unit 42 stores a processing program for the control unit 41 and stores a terminal station free channel list created by the control unit 41. The radio unit 43 performs wireless communication with the base station 11. The extremely low power radio unit 44 transmits and receives at low-power by an extremely low power radio upon establishment of synchronization. The GPS unit 45 obtains location information of the terminal station 12. The operation of the terminal station 12 will be described in a sequence which will be described later.

Figure 4:
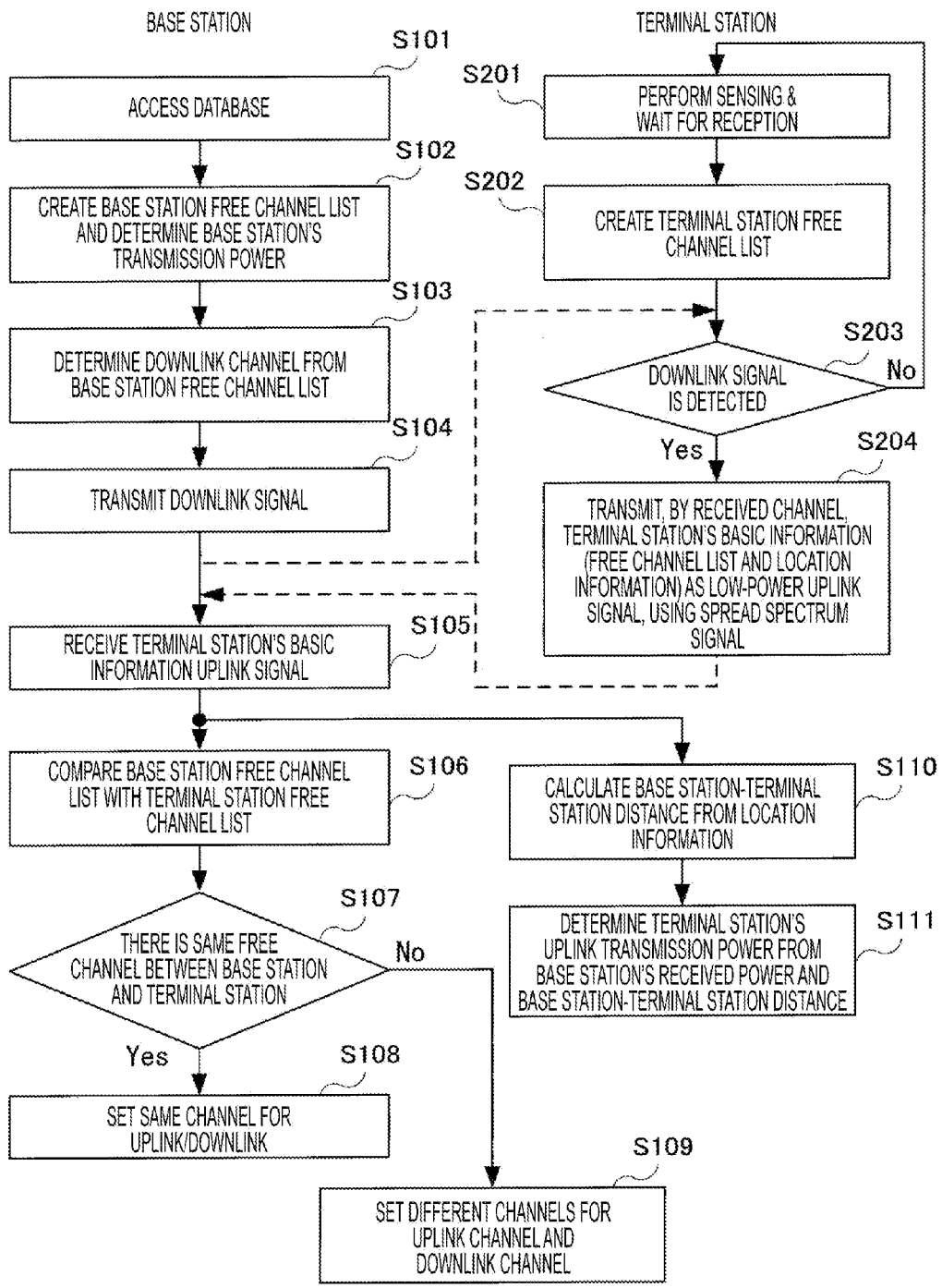
FIG. 4 is an illustrative diagram of a sequence of channel determination and transmission power determination in the first system according to an exemplary embodiment of the present invention.

[Sequence of Channel Determination and Transmission Power Determination in the First System: FIG. 4]

Next, a sequence of channel determination and transmission power determination in the first system will be described using FIG. 4. FIG. 4 is an illustrative diagram of a sequence of channel determination and transmission power determination in the first system. As described above, in the first system, the base station 11 can access the database 40. As shown in FIG. 4, the base station 11 accesses the database 40 to obtain, from the database 40, free channel information including information on available channels and allowed transmission power (e.g., EIRP), etc. (S101).

Then, the base station 11 creates a base station free channel list based on the obtained information and stores the list in the storage unit 32, and determines base station's downlink transmission power such that the base station's downlink transmission power is within allowable EIRP (S102). The base station's downlink transmission power is transmission power from the radio unit 33. Here, a transmission power value with some allowance is determined in consideration of a certain degree of propagation path loss. Then, the base station 11 determines a downlink channel based on the base station free channel list (S103) and transmits a downlink signal (S104).

On the other hand, the terminal station 12 searches for available channels by performing sensing, and waits for a downlink signal from the base station 11 (S201). In addition, the GPS unit 45 obtains and stores location information of the terminal station 12. The control unit 41 of the terminal station 12 creates a terminal station free channel list based on the results of the sensing and stores the list in the storage unit 42 (S202).

Then, when the terminal station 12 detects the downlink signal from the base station 11 (S203), the terminal station 12 transmits, using a received channel, terminal station's basic information to the base station 11, as a low-power uplink signal, using a spread spectrum signal (S204). The terminal station's basic information includes the terminal station free channel list and the location information of the terminal station 12. By transmitting the uplink signal from the terminal station 12 by extremely low power wireless communication, interference caused to the primary use system upon establishment of synchronization is prevented.

When the base station 11 receives the terminal station's basic information from the terminal station 12 (S105), the base station 11 compares the terminal station free channel list included in the terminal station's basic information with the base station free channel list stored in the storage unit 32 (S106).

Then, the base station 11 determines whether there is the same free channel between the terminal station free channel list and the base station free channel list (S107). If, at the process S107, there is the same free channel (if Yes), the base station 11 determines an uplink channel and a downlink channel to be this same free channel. That is, if there is a common free channel between the base station 11 and the terminal station 12, uplink/downlink channels are set to the same channel (S108). By this, frequency resources can be effectively utilized without causing interference.

In addition, if, at the process S107, there is no same free channel (if No), the base station 11 determines an uplink channel and a downlink channel as different channels. The base station 11 determines the downlink channel based on the base station free channel list, and determines the uplink channel based on the terminal station free channel list (S111). By this, even if there is no common free channel, transmission signals from the base station 11 and the terminal station 12 do not cause interference.

Furthermore, the base station 11 reads the location information of the terminal station 12 from the terminal station's basic information received at the process S105, and obtains its location information from the GPS unit 35 to calculate a distance between the base station 11 and the terminal station 12 (base station-terminal station distance) from the location information of the base station 11 and the location information of the terminal station 12 (S110).

Then, the base station 11 determines terminal station's uplink transmission power, based on the distance calculated at the process S110 (S111). At that time, the received power of the uplink signal (base station's received power) at the process S105 is also considered. In the first system, the storage unit 32 of the base station 11 stores, as information for determining terminal station's uplink transmission power, for example, base station-terminal station distances and terminal station's default uplink transmission powers in association with each other. Then, transmission power associated with a calculated base station-terminal station distance is read and determined as terminal station's uplink transmission power.

Furthermore, the storage unit 32 of the base station 11 stores appropriate ranges of base station's received power for extremely low power wireless communication, in association with base station-terminal station distances. When the base station's received power at the process S105 is out of an appropriate range, the base station 11 determines terminal's uplink transmission power as a value larger or smaller than a default value.

In addition, even upon communication after establishing synchronization, the base station 11 may control terminal's uplink transmission power such that base station's received power falls within an appropriate range. For example, when the base station's received power is Pri, and if the terminal station transmits the signal at specified power Pti, then the amount of propagation attenuation H is represented by H=Pri/Pti. Then, if the power to be received by the terminal for the actual communication after establishing synchronization is Pr, then the required transmission power Pt is Pt=Pr/H. In this manner, the terminal station's uplink transmission power is determined.

Note, however, that if the terminal station's uplink transmission power is determined only by the base station's received power, there may emerge a terminal station that demands excess power despite a short distance, due to the influence of multipath, etc. Thus, in that case, power is controlled to be somewhat smaller by, for example, taking an intermediate value between transmission power that is determined by the distance and transmission power that is determined by the base station's received power. In this manner, a sequence of channel determination and transmission power determination in the first system is performed.

Figure 5:
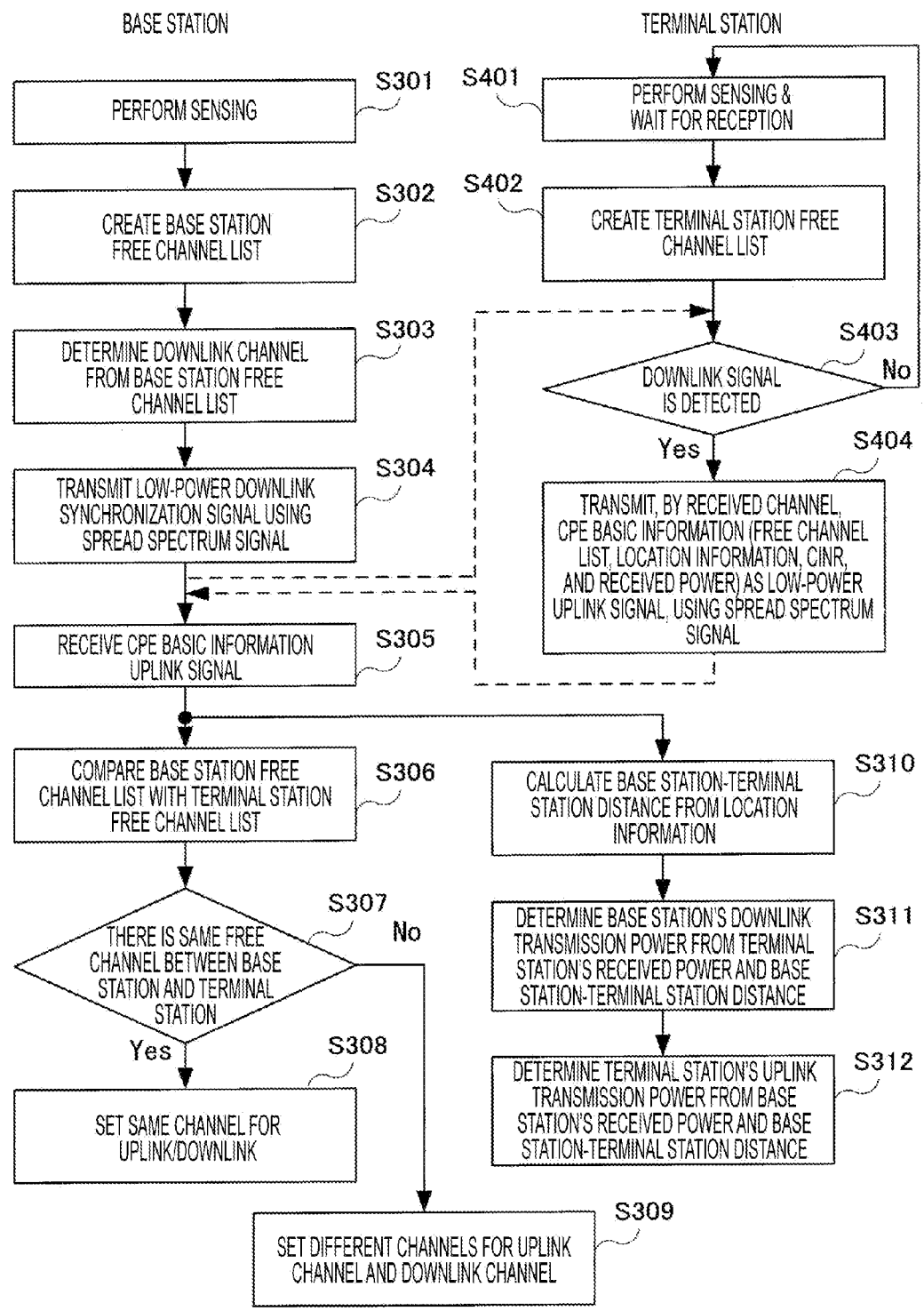
FIG. 5 is an illustrative diagram of a sequence of channel determination and transmission power determination in a second system according to an exemplary embodiment of the present invention.

[Sequence of Channel Determination and Transmission Power Determination in the Second System: FIG. 5]

Next, a sequence of channel determination and transmission power determination in the second system will be described using FIG. 5. FIG. 5 is an illustrative diagram of a sequence of channel determination and transmission power determination in the second system. The second system is a mode of the case in which the base station 21 cannot access the database 40 and thus does not use information from the database 40. Hence, as shown in FIG. 5, the base station 21 checks a channel use state by performing sensing (S301). Then, the base station 21 creates and stores a base station (BS) free channel list, based on the results of the sensing (S302).

The base station 21 determines a downlink channel, based on the base station free channel list (S303). Then, the second system includes the base station 21 transmitting a downlink synchronization signal by low-power transmission using a spread spectrum signal (S304). In the second system, since allowable transmission power is unknown, transmission needs to be performed at the smallest possible power so as not to cause interference to other systems. Thus, the base station 21 also performs extremely low power wireless communication.

The terminal station 22 performs sensing in the same manner as the first system and waits for a downlink synchronization signal (S401), and creates and stores a terminal station free channel list, based on the results of the sensing (S402). Then, when the terminal station 22 detects the downlink signal from the base station 11 (S403), the terminal station 22 transmits, by a received channel, Customer Premises Equipment (CPE) basic information (terminal station's basic information) at low power, as information regarding the terminal station 22, using a spread spectrum signal (S404). The CPE basic information includes the terminal station free channel list, location information, Carrier to Interference and Noise Ratio (CINR), and information on the terminal station's received power. The CINR is naturally generated upon reception of a spread spectrum signal.

When the base station 21 receives an uplink signal including the CPE basic information from the terminal station 22 (S305), the base station 21 compares the terminal station free channel list included in the received CPE basic information with the base station free channel list stored in the storage unit (S306) to determine whether there is the same free channel between the base station 21 and the terminal station 22 (S307).

Here, the base station 21 can check the terminal station free channel list, using the CINR included in the CPE basic information. The CINR is measured by the terminal station 22 actually receiving a spread spectrum signal. By dividing a received signal level (subtraction in the case of a logarithm), interference wave power can be grasped. That is, the CINR makes it possible to more accurately determine whether the channel is free at the location of the terminal station 22.

If there is the same free channel between the base station 21 and the terminal station 22 (if Yes), the base station 21 determines the free channel as uplink/downlink channels (S308). In addition, if there is no same free channel between the base station 21 and the terminal station 22, the base station 21 determines an uplink channel and a downlink channel as different channels (S309).

In addition, when the base station 21 receives the CPE basic information at the process S305, the base station 21 calculates a base station-terminal station distance, based on the location information of the base station 21 and the location information of the terminal station 22 (S310). Then, the base station 21 determines downlink transmission power, based on the information on the terminal station's received power and the base station-terminal station distance (S311).

Furthermore, the base station 21 determines terminal station's uplink transmission power, based on information on the base station's received power and the base station-terminal station distance (S312). In addition, the base station 21 may determine a necessary and sufficient uplink transmission power of the terminal station, using the CINR instead of the base station's received power. Furthermore, the base station 21 can also use the information on the terminal station's received power instead of the information on the base station's received power.

Then, in either case, when control is performed to increase the terminal station's uplink transmission power, the control is performed by referring to the base station-terminal station distance, such that the power does not exceed an appropriate range which is set according to the distance. After establishing synchronization, by CINR feedback, communication is performed at the minimum necessary power for a communication counterpart to receive a signal. In this manner, a sequence of channel determination/transmission power determination in the second system is performed.

Advantageous Effects of the Exemplary Embodiment

The first system according to an exemplary embodiment of the present invention is a wireless communication system in which the base station 11 can access the database 40 of the secondary use system, each of the base station 11 and the terminal station 12 obtains its location information, the terminal station 12 transmits a terminal station free channel list and its location information by extremely low power wireless communication upon establishment of synchronization, and the base station 11 compares a base station free channel list created based on the database 40 with the terminal station free channel list from the terminal station 12 and determines, when there is a common free channel, the free channel as uplink/downlink channels and determines, when there is no common free channel, an uplink channel and a downlink channel as different channels, and calculates a base station-terminal station distance from the location information of the base station 11 and the location information of the terminal station 12, and determines terminal station's uplink transmission power based on the distance. Thus, there is an advantageous effect that by preventing transmission power for uplink communication from becoming larger than necessary, interference caused to the primary use system can be avoided.

In addition, the second system according to an exemplary embodiment of the present invention is a wireless communication system in which, when the base station 21 cannot access the database 40, each of the base station 21 and the terminal station 22 obtains its location information, the terminal station 22 transmits a terminal station free channel list and its location information by extremely low power wireless communication upon establishment of synchronization, and the base station 21 compares a base station free channel list created based on sensing with the terminal station free channel list from the terminal station 22 and determines, when there is a common free channel, the free channel as uplink/downlink channels and determines, when there is no common free channel, an uplink channel and a downlink channel as different channels, and calculates a base station-terminal station distance from the location information of the base station 21 and the location information of the terminal station 22, and determines terminal station's uplink transmission power based on the distance. Thus, there is an advantageous effect that by preventing transmission power for uplink communication from becoming larger than necessary, interference caused to the primary use system can be avoided.

INDUSTRIAL APPLICABILITY

The present invention is suitable for a wireless communication system capable of avoiding interference caused to a primary use system.

REFERENCE SIGNS LIST 1, 11, 21 BASE STATION
2, 5, 12, 22 TERMINAL STATION
3 SECONDARY USER AREA
10, 20 AREA
4 PRIMARY USER AREA
30 NETWORK
40 DATABASE
50 PRIMARY USE SYSTEM
31, 41 CONTROL UNIT
32, 42 STORAGE UNIT
33, 43 RADIO UNIT
34, 44 EXTREMELY LOW POWER RADIO UNIT
35, 45 GPS UNIT
36 INTERFACE UNIT
FIG. 1
SCHEMATIC CONFIGURATION OF THE SYSTEM
NETWORK
DATABASE
PRIMARY USE SYSTEM
FIG. 2
CONFIGURATION OF BASE STATION TO NETWORK CONTROL UNIT
31 COMMUNICATION CONTROL MEANS
 CHANNEL DETERMINATION MEANS
 TRANSMISSION POWER DETERMINATION MEANS
 SENSING MEANS
32 STORAGE UNIT
 BASE STATION FREE CHANNEL LIST
33 RADIO UNIT
34 EXTREMELY LOW POWER RADIO UNIT
36 INTERFACE UNIT
FIG. 3
CONFIGURATION OF TERMINAL STATION
41 CONTROL UNIT
 COMMUNICATION CONTROL MEANS
 SENSING MEANS
42 STORAGE UNIT
 TERMINAL STATION FREE CHANNEL LIST
43 RADIO UNIT
44 EXTREMELY LOW POWER RADIO UNIT
FIG. 4
SEQUENCE OF CHANNEL DETERMINATION AND TRANSMISSION POWER DETERMINATION IN FIRST SYSTEM
BASE STATION
S101 ACCESS DATABASE
S102 CREATE BASE STATION FREE CHANNEL LIST AND DETERMINE BASE STATION'S TRANSMISSION POWER
S103 DETERMINE DOWNLINK CHANNEL FROM BASE STATION FREE CHANNEL LIST
S104 TRANSMIT DOWNLINK SIGNAL
S105 RECEIVE TERMINAL STATION'S BASIC INFORMATION UPLINK SIGNAL
S106 COMPARE BASE STATION FREE CHANNEL LIST WITH TERMINAL STATION FREE CHANNEL LIST
S107 THERE IS SAME FREE CHANNEL BETWEEN BASE STATION AND TERMINAL STATION
S108 SET SAME CHANNEL FOR UPLINK/DOWNLINK
S109 SET DIFFERENT CHANNELS FOR UPLINK CHANNEL AND DOWNLINK CHANNEL
S110 CALCULATE BASE STATION-TERMINAL STATION DISTANCE FROM LOCATION INFORMATION
S111 DETERMINE TERMINAL STATION'S UPLINK TRANSMISSION POWER FROM BASE STATION'S RECEIVED POWER AND BASE STATION-TERMINAL STATION DISTANCE
TERMINAL STATION
S201 PERFORM SENSING & WAIT FOR RECEPTION
S202 CREATE TERMINAL STATION FREE CHANNEL LIST
S203 DOWNLINK SIGNAL IS DETECTED
S204 TRANSMIT, BY RECEIVED CHANNEL, TERMINAL STATION'S BASIC INFORMATION (FREE CHANNEL LIST AND LOCATION INFORMATION) AS LOW-POWER UPLINK SIGNAL, USING SPREAD SPECTRUM SIGNAL
FIG. 5
SEQUENCE OF CHANNEL DETERMINATION AND TRANSMISSION POWER DETERMINATION IN SECOND SYSTEM
BASE STATION
S301 PERFORM SENSING
S302 CREATE BASE STATION FREE CHANNEL LIST

Figure 6:
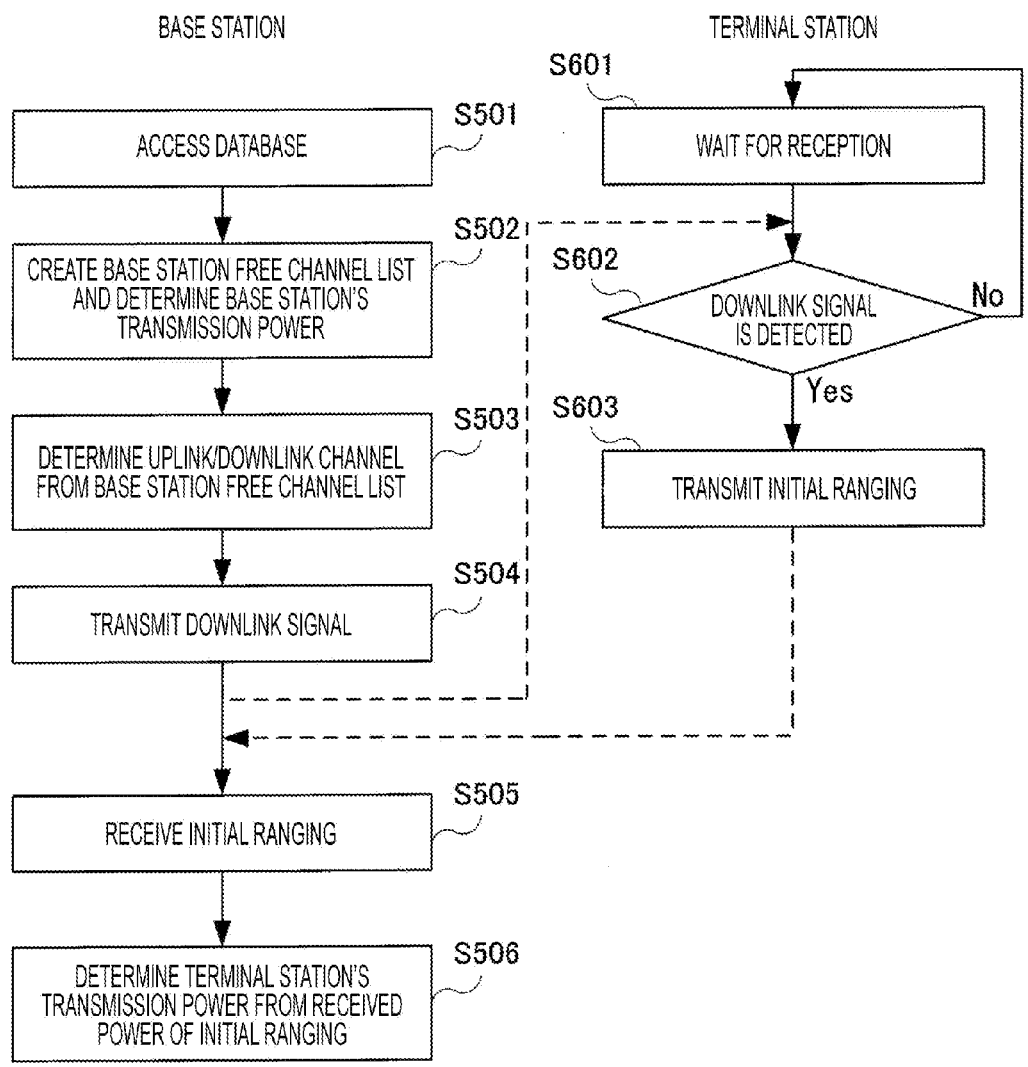
FIG. 6 is a flowchart showing a sequence of conventional channel determination/transmission power determination in a secondary use system.
Figure 7:
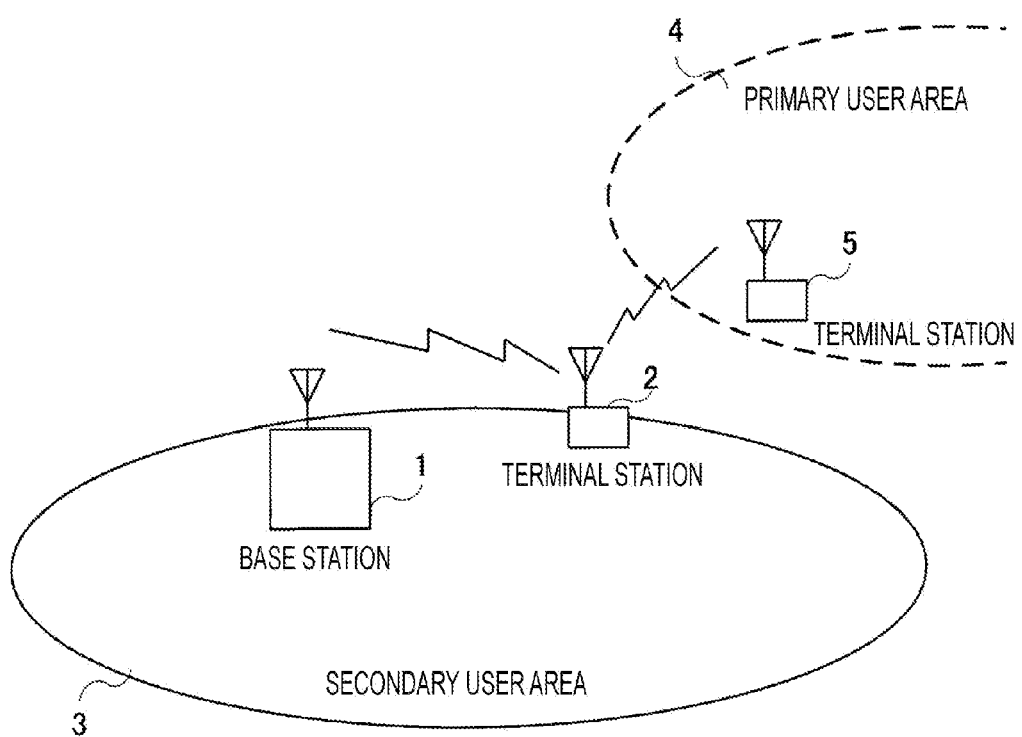
FIG. 7 is a schematic illustrative diagram showing interference on a primary use system caused by the secondary use system.

S303 DETERMINE DOWNLINK CHANNEL FROM BASE STATION FREE CHANNEL LIST
S304 TRANSMIT LOW-POWER DOWNLINK SYNCHRONIZATION SIGNAL USING SPREAD SPECTRUM SIGNAL
S305 RECEIVE CPE BASIC INFORMATION UPLINK SIGNAL
S306 COMPARE BASE STATION FREE CHANNEL LIST WITH TERMINAL STATION FREE CHANNEL LIST
S307 THERE IS SAME FREE CHANNEL BETWEEN BASE STATION AND TERMINAL STATION
S308 SET SAME CHANNEL FOR UPLINK/DOWNLINK
S309 SET DIFFERENT CHANNELS FOR UPLINK CHANNEL AND DOWNLINK CHANNEL
S310 CALCULATE BASE STATION-TERMINAL STATION DISTANCE FROM LOCATION INFORMATION
S311 DETERMINE BASE STATION'S DOWNLINK TRANSMISSION POWER FROM TERMINAL STATION'S RECEIVED POWER AND BASE STATION-TERMINAL STATION DISTANCE
S312 DETERMINE TERMINAL STATION'S UPLINK TRANSMISSION POWER FROM BASE STATION'S RECEIVED POWER AND BASE STATION-TERMINAL STATION DISTANCE
TERMINAL STATION
S401 PERFORM SENSING & WAIT FOR RECEPTION
S402 CREATE TERMINAL STATION FREE CHANNEL LIST
S403 DOWNLINK SIGNAL IS DETECTED
S404 TRANSMIT, BY RECEIVED CHANNEL, CPE BASIC INFORMATION (FREE CHANNEL LIST, LOCATION INFORMATION, CINR, AND RECEIVED POWER) AS LOW-POWER UPLINK SIGNAL, USING SPREAD SPECTRUM SIGNAL
FIG. 6
SEQUENCE OF CONVENTIONAL CHANNEL DETERMINATION AND TRANSMISSION POWER DETERMINATION
BASE STATION
S501 ACCESS DATABASE
S502 CREATE BASE STATION FREE CHANNEL LIST AND DETERMINE BASE STATION'S TRANSMISSION POWER
S503 DETERMINE UPLINK/DOWNLINK CHANNEL FROM BASE STATION FREE CHANNEL LIST
S504 TRANSMIT DOWNLINK SIGNAL
S505 RECEIVE INITIAL RANGING
S506 DETERMINE TERMINAL STATION'S TRANSMISSION POWER FROM RECEIVED POWER OF INITIAL RANGING
TERMINAL STATION
S601 WAIT FOR RECEPTION
S602 DOWNLINK SIGNAL IS DETECTED
S603 TRANSMIT INITIAL RANGING
FIG. 7
INTERFERENCE ON PRIMARY USE SYSTEM CAUSED BY SECONDARY USE SYSTEM
1 BASE STATION
2 TERMINAL STATION
3 SECONDARY USER AREA
4 PRIMARY USER AREA
5 TERMINAL STATION

The invention claimed is:

1. A wireless communication system that performs wireless communication between a base station and a terminal station, using a white space, the wireless communication system comprising:
a base station configured to:
create and store a base station free channel list as information on available channels, and
obtain and store location information of the base station;
a terminal station configured to:
create and store a terminal station free channel list as information on available channels, and
obtain and store location information of the terminal station;
wherein, the terminal station includes a first extremely low power radio so that transmitting power of the first extremely low power radio prevents interference on an existing wireless system having a license to use assigned frequencies, in response to the terminal station receiving a downlink signal from the base station upon establishment of synchronization, the terminal station is configured to transmit an uplink signal including at least the location information of the terminal station and the terminal station free channel list to the base station, by extremely low power wireless communication using the first extremely low power radio, and
wherein, the base station includes a second extremely low power radio so that transmitting power of the second extremely low power radio prevents interference on an existing wireless system having a license to use assigned frequencies, in response to the base station receiving the uplink signal from the terminal station by extremely low power wireless communication using the second extremely low power radio, the base station is configured to:
calculate a distance between the base station and the terminal station based on the location information of the terminal station included in the received uplink signal and the location information of the base station,
determine an uplink transmission power of the terminal station based on the calculated distance,
compare the terminal station free channel list with the base station free channel list,
in response to a common free channel between the terminal station free channel list and the base station free channel list, determine the common free channel as an uplink channel and a downlink channel, and
in response to no common free channel, determine an uplink channel and a downlink channel as different channels.

2. The wireless communication system of claim 1, wherein the base station is further configured to:
access a database to obtain information on channels available to the base station to create a base station free channel list,
wherein the database is configured to manage the information on the available channels.

3. The wireless communication system of claim 1, wherein the base station is further configured to:
identify available channels by sensing,
create a base station free channel list, and
transmit a downlink signal to the terminal station by extremely low power wireless communication,
wherein using the spread spectrum signal so as to prevent interference on an existing wireless system having a license to use assigned frequencies.

4. The wireless communication system of claim 1, wherein in response to the no common free channel between the terminal station free channel list and the base station free channel list as a result of the comparison between the terminal station free channel list and the base station free channel list, the base station is configured to:
  determine an uplink channel based on the terminal station free channel list, and
  determine a downlink channel based on the base station free channel list.

5. The wireless communication system of claim 2, wherein in response to the no common free channel between the terminal station free channel list and the base station free channel list as a result of the comparison between the terminal station free channel list and the base station free channel list, the base station is configured to:
  determine an uplink channel based on the terminal station free channel list, and
  determine a downlink channel based on the base station free channel list.

6. The wireless communication system of claim 3, wherein in response to the no common free channel between the terminal station free channel list and the base station free channel list as a result of the comparison between the terminal station free channel list and the base station free channel list, the base station is configured to:
  determine an uplink channel based on the terminal station free channel list, and
  determine a downlink channel based on the base station free channel list.

* * * * *